Nov 24, 1953 W. J. FIELD ET AL 2,660,622

MAGNETIC TELEGRAPHOPHONE TRANSDUCER

Filed Sept. 27, 1949

2 Sheets-Sheet 1

INVENTORS
WILLIAM J. FIELD
& ROBERT L. PERKINS

BY Cushman, Darby & Cushman
ATTORNEY

Nov 24, 1953 W. J. FIELD ET AL 2,660,622

MAGNETIC TELEGRAPHOPHONE TRANSDUCER

Filed Sept. 27, 1949

2 Sheets-Sheet 2

INVENTORS
WILLIAM J. FIELD
& ROBERT L. PERKINS

BY Cushman, Darby & Cushman
ATTORNEY

Patented Nov. 24, 1953

2,660,622

UNITED STATES PATENT OFFICE 2,660,622

MAGNETIC TELEGRAPHOPHONE TRANSDUCER

William J. Field, Minneapolis, and Robert L. Perkins, St. Paul, Minn., assignors to Engineering Research Associates, Inc., St. Paul, Minn., a corporation of Minnesota Application September 27, 1949, Serial No. 118,034

2 Claims. (Cl. 179—100.2)

Figure 1A:
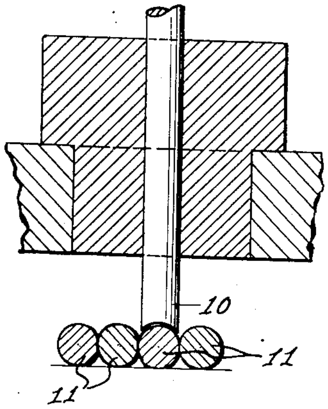
Figure 1B:
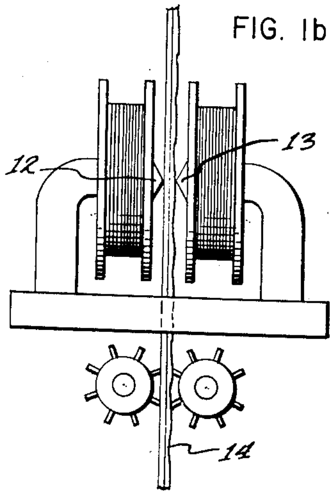
Figure 1C:
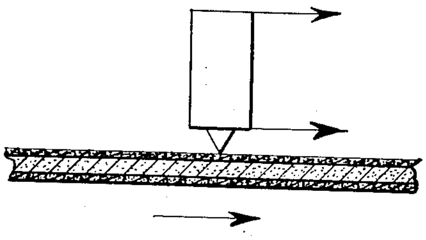
Figure 1E:
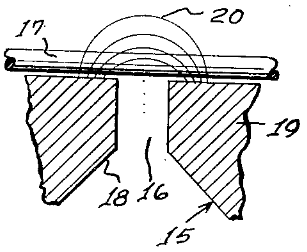
Figure 1D:
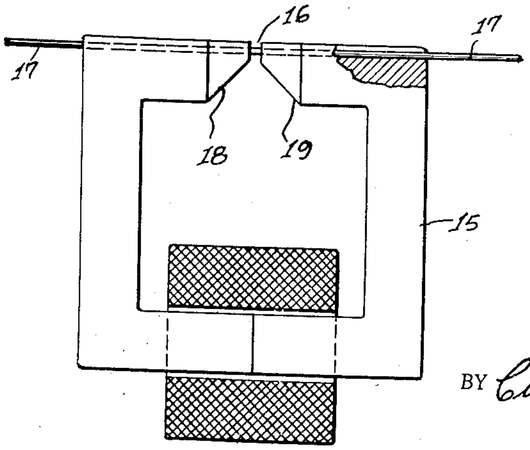

The present invention relates to an improved transducer for the recording and reproduction of magnetic telegraphophone recordings. In more detail, this invention concerns an improvement in the transducers or "heads" which results in the recording of records with a higher degree of retained magnetism, the reproduction therefrom at a higher output signal level, and in increase in the fineness of recording.

It is therefore a primary object of this invention to provide a transducer or head which (for a given input signal) will give more intense recordings and which (for a given recording) will reproduce therefrom a larger output signal than that available from presently existing heads of this type. It is a further object of this invention to provide a head capable of operating in conjunction with the magnetic recording material so as to produce and reproduce therefrom recordings of increased fineness (i. e., the minimum usable wave length on the magnetic medium will be diminished).

Although the foregoing objects and other beneficial results are achieved to some degree in any type of magnetic recording in which this invention is practiced, it will be found that the technique of this invention is especially effective in the case of pulse recording in which square waves or peaked waves are encountered. The high frequency components of such pulse wave shapes are especially well suited to the hereinafter described techniques and permit the achievement of the novel and beneficial results.

The desirability of the above objectives has long been recognized. A great many inventors have attempted numerous schemes for "concentrating" or "focusing" the magnetic flux in a very small area. Among other schemes which have been tried with varying degrees of success might be mentioned the use of pole tips with razor-sharp edges, and the use of pole tips on opposite sides of recording media with an offset between their opposite edges.

More recently, however, the tendency has been to use a structure composed of a magnetic material in the shape of a ring having a small gap therein composed of air or other non-magnetic material. In this case, the only useful magnetic flux is that which fails to go straight across the gap and therefore "fringes" outside of the gap. Many attempts have been made to increase the amount of this fringing flux (while maintaining it concentrated in the immediate vicinity of the gap) but, in general, these attempts have usually been directed toward the shaping of the pole tips and only limited success has resulted from these endeavors. The present invention very greatly increases the amount of this useful fringing flux in a simple and novel manner as hereinafter disclosed.

A further object of the invention is to provide a transducer capable of the improved performance as referred to above, which is characterized by the cheapness of its construction and the facility with which its components may be assembled.

Figure 2:
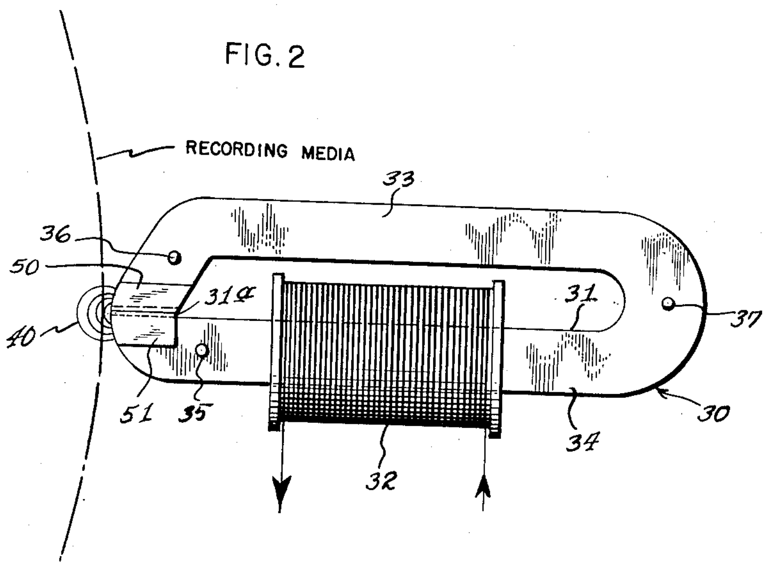
Figure 3:
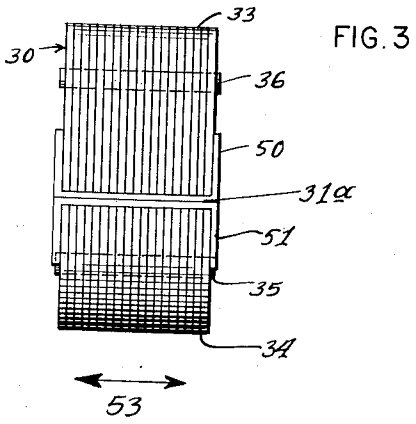

A fuller understanding of this invention, together with the manner in which it improves over previous practices, may be had by reference to the attached drawings in which:

Figures 1(*a*) through 1(*e*) are diagrammatic views representative of certain earlier attempts to achieve some of the objectives of this invention, Figure 2 is a side elevational view of one form of magnetic transducer or head constructed in conformance with this invention, and Figure 3 is an end view of the head shown in Figure 2.

Figure 1(*a*) is taken from an illustration of Patent No. 661,619 issued in 1900 to Valdimar Poulsen. The head here shown consists of no more than a steel bar 10 of approximately the same diameter as the magnetic wire 11 with which it operates. The tip of bar 10 appears to be hollowed out to conform to the contour of the wire, but otherwise there appears to be no particular effort to shape this element in a definite manner. Figure 1(*b*), taken from Patent No. 1,213,150, shows an early attempt to achieve improved results by the expedient of using pole tips which are deliberately narrowed down at the point where they contact (or nearly contact) the magnetic medium. In this drawing, 12 and 13 illustrate the pole tips and 14 illustrates the magnetic tape which, in this case, is a piece of specially prepared 35 mm. film. Figure 1(*c*) illustrates a more extreme case of endeavors along this line; this is taken from Patent No. 2,254,933 issued September 2, 1941, to James W. Bryce. Figures 1(*d*) and 1(*e*) taken from Patent No. 2,351,007 issued June 13, 1944, to Marvin Camras, shows an early attempt to use a head based upon a nearly closed magnetic circuit having a very small gap therein. In this disclosure, the magnetic structure 15 is almost completely closed, but there is a small gap 16 across which the magnetic media (in this case a wire 17) may be drawn by means of suitable guides and pulleys. This structure results in the formation of pole tips 18 and 19 against which the wire 17 is rubbed. The only effective flux which is of use in influencing the magnetic wire in the recording process is that part which "fringes" the gap as is schematically illustrated at 20. This patent discloses an attempt to increase and concentrate this infringing flux 20 by the expedient of shaping the pole pieces as they approach the gap so that they become narrower in the directions perpendicular to the wire.

The foregoing earlier attempts to increase and concentrate, or to "focus," the useful magnetic flux may have resulted in some limited degree of improvement. But a more substantial degree of improvement results from employment of the means provided by the present invention, which means will now be described in detail with reference to Figures 2 and 3.

Figures 2 and 3 illustrate a novel form of magnetic telegraphophone transducer or head which is especially adapted for use in connection with recording on and reading and erasing from a magnetic surface which is not actually in rubbing contact with the head. This so-called non-contact operation of magnetic heads is discussed more fully in the following applications for U. S. Letters Patent: 16,997, Coombs et al., and 16,998, Cohen et al., both filed March 25, 1948, and 90,941, Coombs, filed May 2, 1949. However, the principle of the present head is also applicable to contact operation in which the recording media rubs frictionally against the pole tips.

The non-contact operation referred to has been successfully employed using magnetic heads spaced from tapes mounted on a high speed rotating drum, the tapes consisting of paramagnetic material held in a suitable binder, such as paper tapes coated with iron oxide cemented to the surface of a machined aluminum drum, and such "recording media" is indicated in association with the head in Figure 2 of the drawings. The magnetic gap of the head may be of the order of .003 inch and this gap of the head may be positioned immediately adjacent the drum periphery, the clearance between the head and the tape being of the order of .002 inch. Satisfactory results have been obtained by having each head read, record, or erase a track as narrow as $\frac{1}{16}$ of an inch wide. The cells or areas on the tape for digit representing signals may be positioned together as closely as eighty to the inch circumferentially of the drum or lengthwise of the tape, giving reliable operation with a drum six inches in diameter and a peripheral velocity of 1600 inches per second. The above figures are illustrative, and are not intended to limit the scope of the invention. The values imprinted in a cell can be altered by imprinting in the cell a pulse of opposite magnetic polarity, as is referred to in the co-pending applications referred to above. The heads are capable of energization by varying signal current and they may be appropriately energized to record on the tape, to read from the tape, and to erase from the tape, by associating the head with suitable circuits for these purposes. Signals of the desired value are recorded in the track or tape by generating flux in a chosen direction through the magnet or head.

The head of the present invention consists of a pile-up of laminations of magnetic material such as transformer iron which, taken together, form the magnetic core 30. The laminations comprise a plurality of relatively thin flat plates of paramagnetic material assembled and secured together in face-to-face relationship, as shown, to form the magnetic core. These plates are formed in a substantially oval exterior configuration, and they have registering interior openings therethrough which form a longitudinal opening through the core. As shown in Figure 2, the openings through the plates are elongated providing opposite relatively long side legs and relatively short connecting end legs, and the plates have relatively narrow aligned slots extending laterally through one of their connecting end legs (at the left end in Figure 2) and outwardly from their openings forming a non-magnetic end gap in the core. This gap is defined by a plurality of opposed end edges of said plates. As hereinafter described, means is provided, as shown in Figure 2, for directing an increased quantity of fringing flux outwardly from the gap, this means comprising a separate, solid, non-magnetic shim plate of high electrical conductivity which is secured in and fills the said gap, said shim plate extending across and covering all of the said end edges of said plates which define the gap. As will now be described, the electromagnetic coil 32 comprising a relatively large machine wound bobbin having a relatively large number of turns of conducting wire thereon may be positioned on the long side arms of the head during an assembly operation which precedes the application of the shim plate.

It is a corollary feature of this design that one interior edge 31 of this magnetic core is on the same straight line as one end edge of the gap 31*a*, permitting easy manufacture of the magnetic laminations since it is then possible to stamp them out and to shear along the same straight line so as to form a split which will later become the magnetic gap. Furthermore, this construction facilitates assembly of the laminations with the electromagnetic coil 32 since it is possible to slip on the laminations, one at a time, by the expedient of bending laterally outward the curved portion 33, pushing the straight portion 34 through the coil 32, and then allowing the curved portion 33 to spring back into place of its own accord.

After all of the laminations have been inserted into the coil, they make be staked together so as to form a unitary assembly by riveting through the holes 35, 36 and 37, care being taken to avoid the formation of a short circuited turn; for example, by riveting with a non-conductive rivet. This method of holding laminations together is given by way of illustration only and other methods for performing a unitary assembly, such as by molding the entire device in a plastic, are equally effective in the practice of this invention.

After all the foregoing steps have been completed, the split 31*a* is carefully forced open by any convenient means and a shim of high electrical conductivity is placed therein, after which the portions 33 and 34 are permitted to spring together. An excellent material for this shim is pure silver approximately .001 to .004 inch thick. This shim completely fills the split 31*a* and, additionally, may be carried up alongside the tips 50 and 51 of the magnetic core.

This high conductivity shim serves a very important purpose, as will now be discussed. It has, of course, been recognized in the art that it is desirable to place some material in the magnetic gap in order to maintain the dimensions of this gap permanently and accurately. For example, the use of a filler in the magnetic gap functioning solely as a spacer or dimension-defining element has been suggested. In the case of recorders having a head and a recording wire in contact therewith, the use of a filler of hard material in the gap has been suggested in order that the structure may better withstand the deleterious effects of wear imposed by the frictional contact between the recording wire and head. However, none of these prior art expedients intended for such different purposes has recognized the need for high electrical conductivity in this spacer, which need arises from electrical considerations if the objectives of this invention are to be obtained, and these prior art expedients did not provide a structure adapted for the purposes of the present invention.

The high conductivity shim of the present invention acts as a device to increase the amount of fringing flux as schematically illustrated at point 40 of Figure 2. This shim is actually located in the magnetic circuit of core 30, where it acts as a short-circuited secondary winding and thereby behaves as a "magnetic squirter." Particularly in the case where magnetic pulses are to be recorded, this action increases the density of the fringing flux, accentuates the beginning and termination of such flux during the recording process, and uses to advantage the effects of shunting of the flux by the gap during the reading process.

A more detailed explanation of this action is as follows: Whenever a change is made in the amount of magnetic flux linking the conductive circuit within the gap, an induced electromotive force of value directly proportional to the time rate of change is established in the shim. This force tends to produce a current in such a direction as to oppose the change in flux through the gap. During the period of energizing, in the cases of both writing and reading, the passage of flux through the gap is impeded by the eddy current effects within the shim. In the recording process, this impedance causes an increase of the density and the rate of establishment of the fringing flux at the gap, resulting in a better defined magnetized spot on the storage medium. In the reading process, the added reluctance in the gap causes a greater portion of the resultant flux from the magnetized spot to link the reading winding resulting in an increased signal voltage level. During the de-energized period, the eddy current in the shim hastens the decay of the significant flux threadings. For recording, the effect is that of increasing the rate of collapse of the fringing flux. For reading, the effect is that of decreasing the reluctance through the gap, thus robbing flux from the reading winding and causing a more rapid decay of induced signal voltage.

We have found by actual experiment that the use of a pure silver shim in the gap affords very large improvements over the earlier practices. We have run numerous experiments comparing the performance of two otherwise identical heads, one of which was equipped with a pure silver shim and the other with a shim of low electrical conductivity, and we have found that recording and playback with the former may offer as much as a tenfold improvement over the latter as regards the strength of the readback signal; there is also a substantial gain in the fineness with which individual spots can be recorded on the magnetic material. Stated otherwise, the high conductivity shim affords a tenfold of improvement in the level of the signal amplitude and a substantial improvement in the minimum reproducible wave length which can be recorded on the tape.

As indicated above, the use of a solid shim plate made of pure silver is highly preferred, but the improved results referred to herein may be obtained in a more limited degree by using solid plates of other metals which have a conductivity above fifty per cent of that of silver, such as copper, gold and aluminum.

It will be apparent from the above description that the structure of the present invention permits the use of a relatively large machine wound bobbin 32 having a relatively large number of turns thereon, which produces a relatively strong field across the gap of the head, as distinguished from certain prior art structures which only permit the use of a relatively few hand wound turns of conducting wire and which produce a relatively weak field. The increased field strength provided by the present invention makes practical the use of a system wherein the head is not in contact with the magnetic tape, as shown in Figure 2, and the consequent advantages including the elimination of friction, etc., are readily apparent.

A further improvement in performance is afforded by the expedient of placing an oversize shim in the gap so that its ends may be bent upward and/or downward to surround the side area of the core 30 such as in the areas 50 and 51. These side shims provide for desirable concentration of the flux in the direction 53 shown in Figure 3.

It will be apparent that the design of the head disclosed herein, with its relatively long side legs and correspondingly long central opening, will permit the convenient winding of a plurality of coils on one side leg of the head.

We claim:

1. A magnetic transducer comprising a plurality of relatively thin flat plates of paramagnetic material assembled and secured together in face-to-face relationship to form a magnetic core, said plates having aligned interior openings therethrough forming a longitudinal opening through the core, said plates having relatively narrow aligned slots extending laterally therethrough and outwardly from their openings forming a non-magnetic gap in said core defined by a plurality of opposed end edges of said plates, means for directing an increased quantity of fringing flux outwardly from said gap comprising a pair of non-magnetic shim plates of metal of high conductivity secured in and filling said gap and extending across and being flush with said end edges of said plates, said shim plates having side extensions bent at right angles therefrom to form enclosures of conducting metal on the exterior of the outermost of said plates adjacent said gap.

2. In a magnetic transducer, magnetic pole pieces arranged to define a recording gap therebetween, the edges of the pole pieces being positioned in alignment and adapted for high frequency non-contact operation in close proximity to a moving record member, and means for concentrating recording flux in an area outwardly of the gap, whereby short pulses may be induced into the adjacent record member, said means comprising a flat shim plate of non-magnetic highly conductive material, the shim being of such thickness to completely fill the gap, the edge of the shim lying adjacent the recording side of the gap being flush with the pole pieces, the shim extending beyond the ends of the gap and having end portions bent to extend along the sides of at least one pole piece in planes perpendicular to the plane of the gap to reduce sidewise fringing of flux.

WILLIAM J. FIELD.
ROBERT L. PERKINS.

References Cited in the file of this patent

UNITED STATES PATENTS

| Number | Name | Date |
|---|---|---|
| 2,195,192 | Schuller | Mar. 26, 1940 |
| 2,263,485 | Clopton | Nov. 18, 1941 |
| 2,277,305 | Clopton | Mar. 24, 1942 |
| 2,361,752 | Eilenberger | Oct. 31, 1944 |
| 2,431,540 | Camras | Mar. 2, 1945 |
| 2,456,767 | Camras | Dec. 21, 1948 |
| 2,459,299 | West | Jan. 18, 1949 |
| 2,469,444 | Roys | May 10, 1949 |
| 2,536,272 | Friend | Jan. 2, 1951 |
| 2,549,771 | Camras | Apr. 24, 1951 |
| 2,555,110 | Bobb | May 29, 1951 |
| 2,565,191 | Zenner | Aug. 21, 1951 |